R. V. SUTHERLAND.
DITCHING MACHINE.
APPLICATION FILED SEPT. 16, 1908.

921,179.

Patented May 11, 1909.
7 SHEETS—SHEET 2.

Witnesses:
Inventor
Robert V. Sutherland
By Cyrus W. Rice
Atty

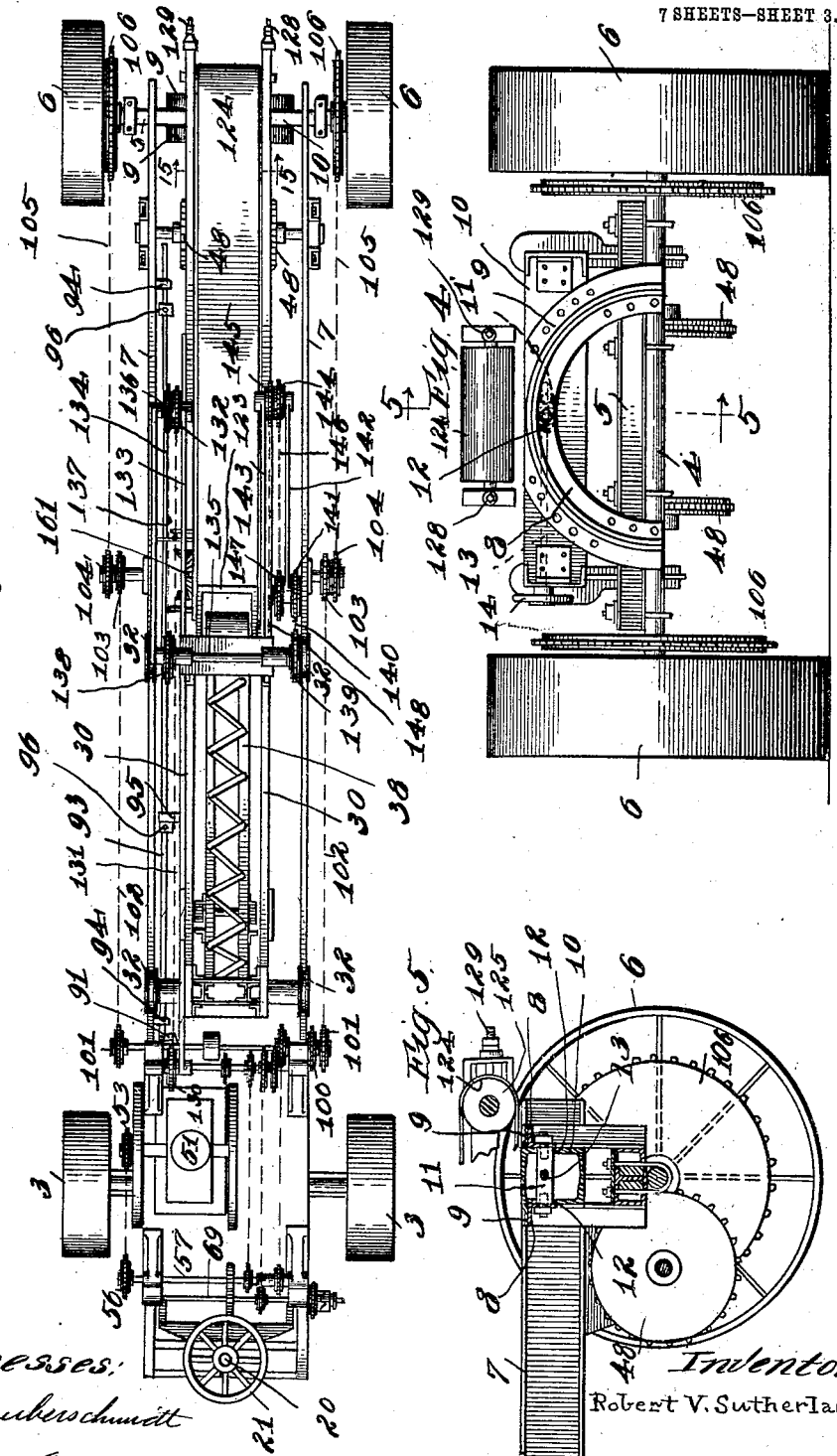

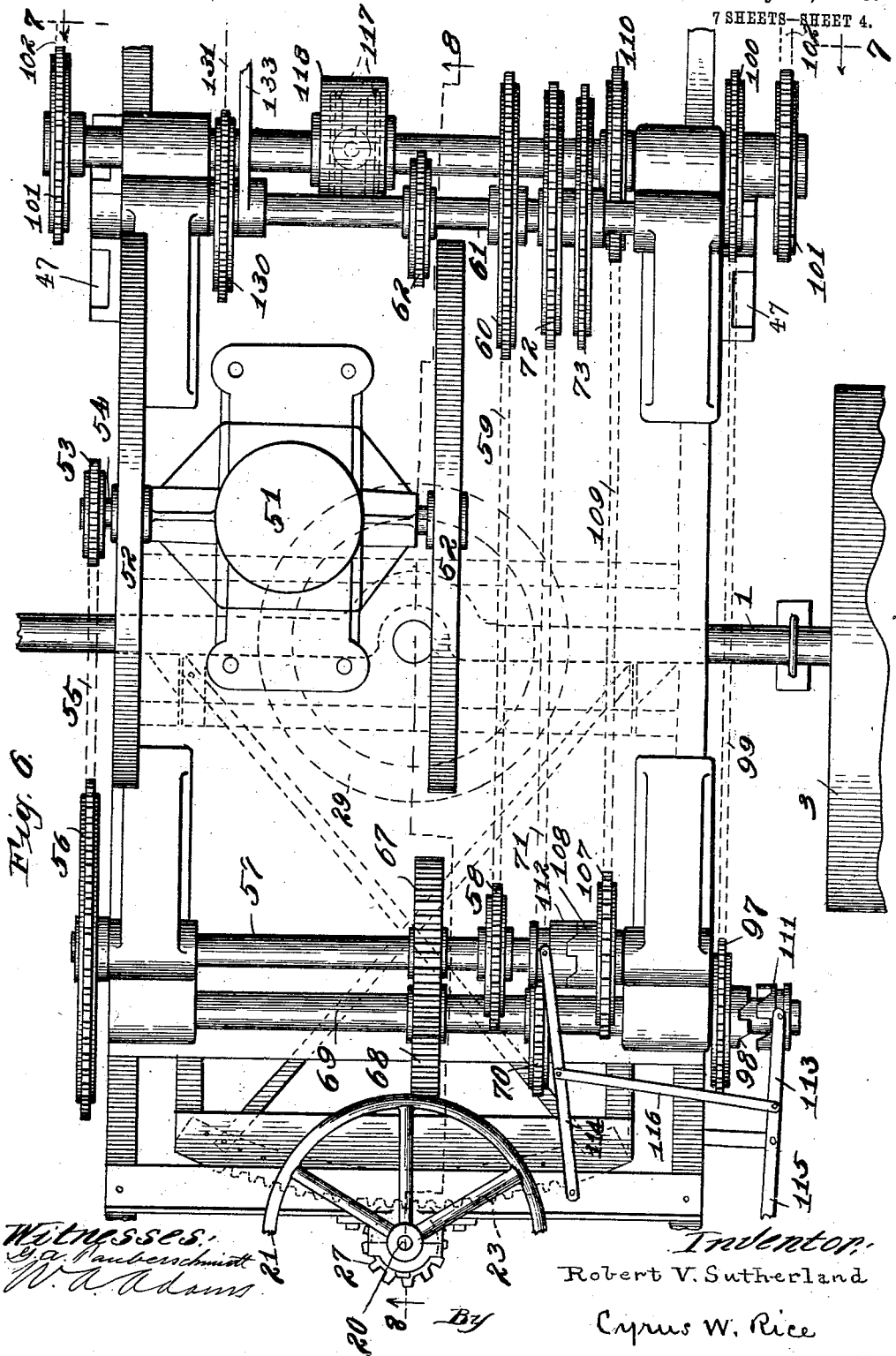

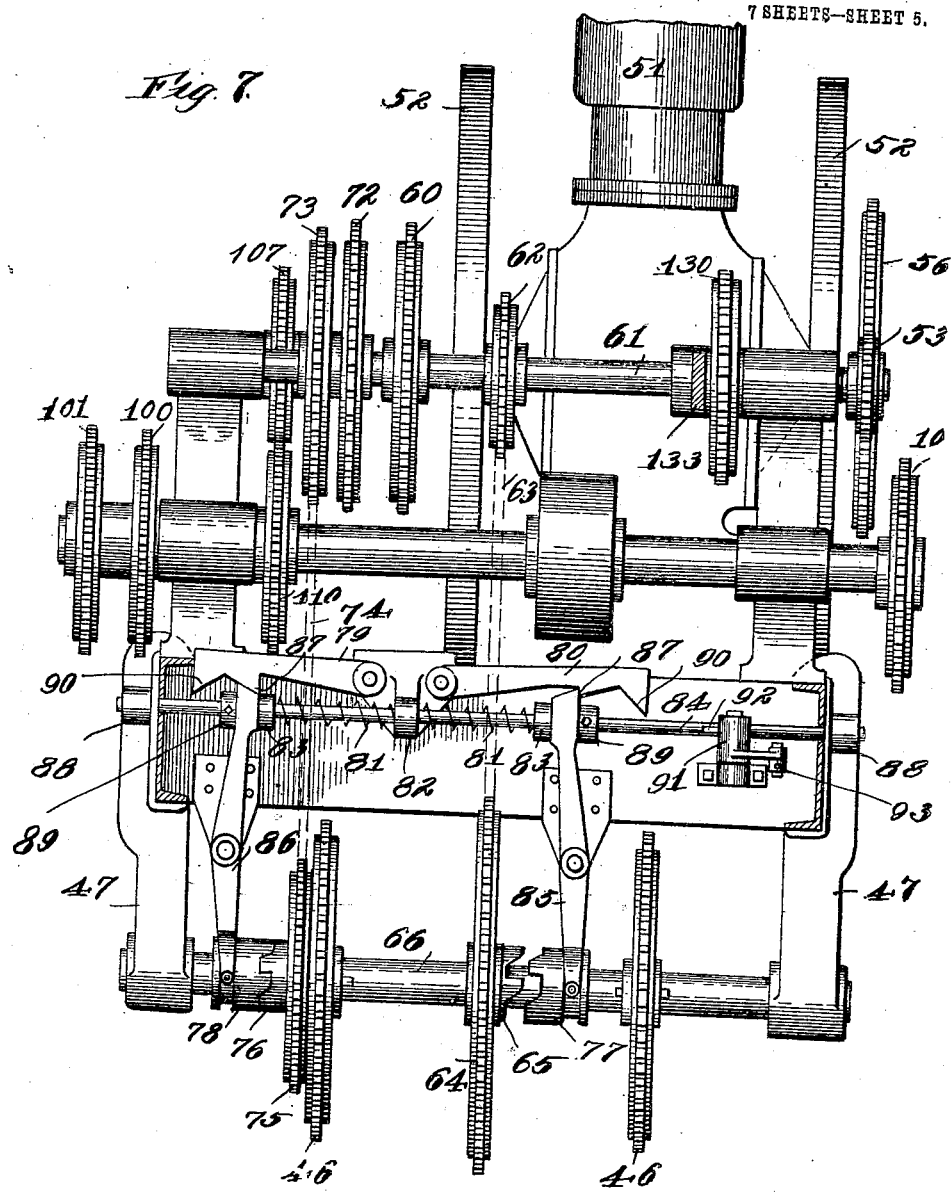

R. V. SUTHERLAND.
DITCHING MACHINE.
APPLICATION FILED SEPT. 16, 1908.
921,179.
Patented May 11, 1909.
7 SHEETS—SHEET 6.
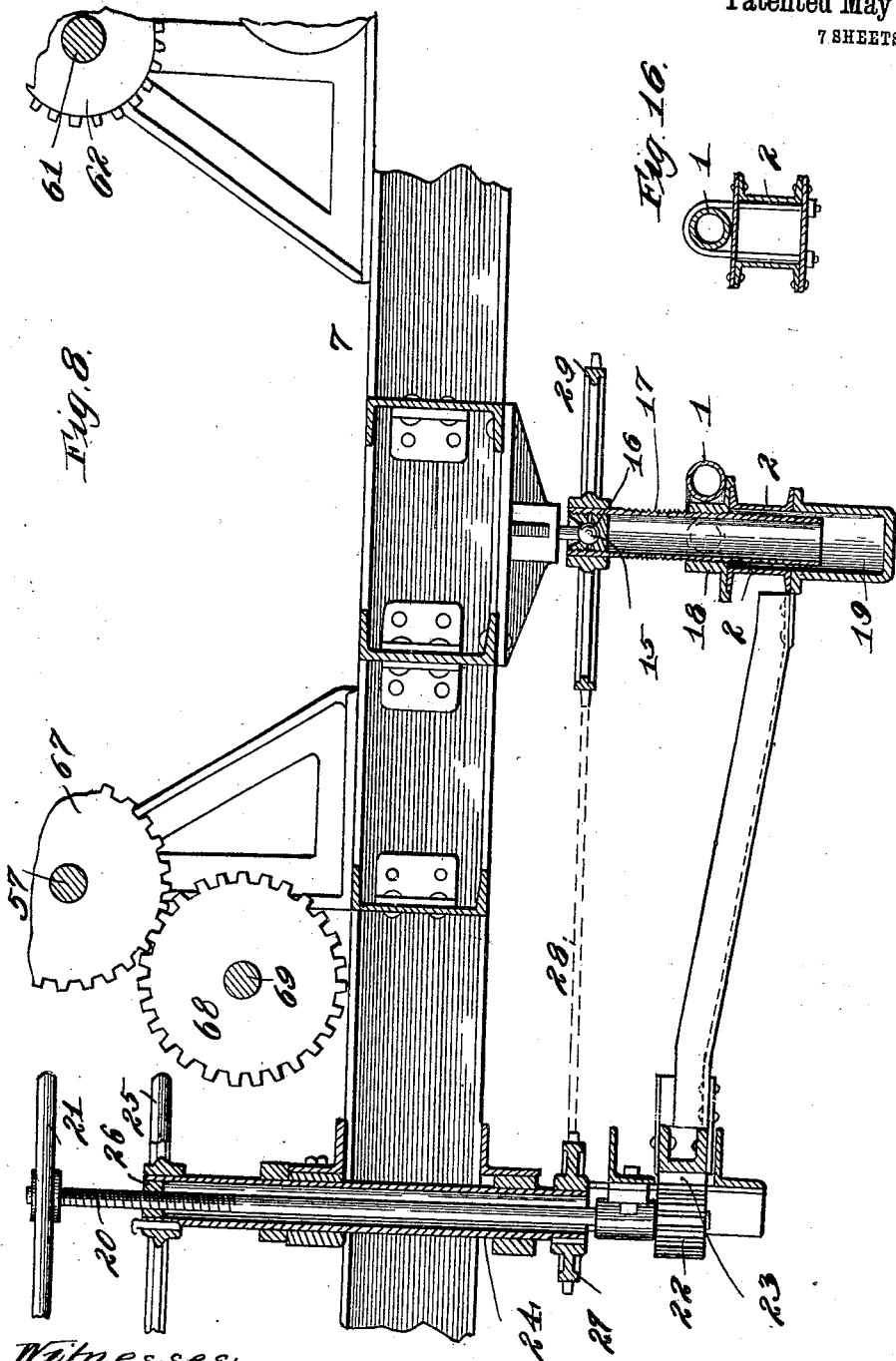

R. V. SUTHERLAND.
DITCHING MACHINE.
APPLICATION FILED SEPT. 16, 1908.
921,179.
Patented May 11, 1909.
7 SHEETS—SHEET 7.
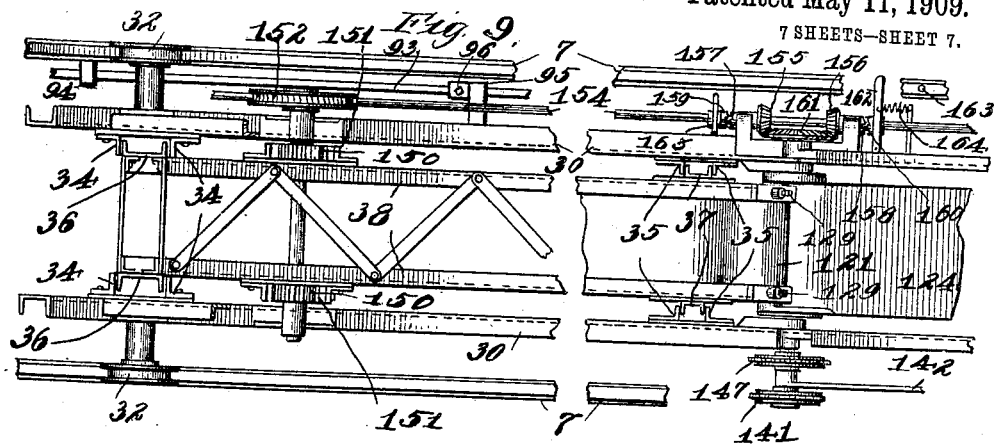
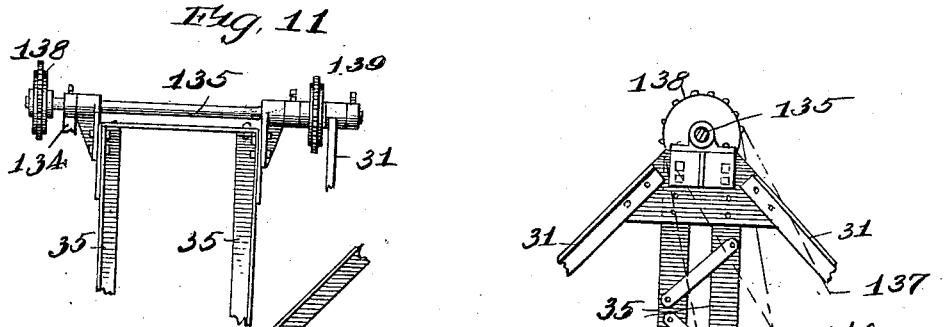
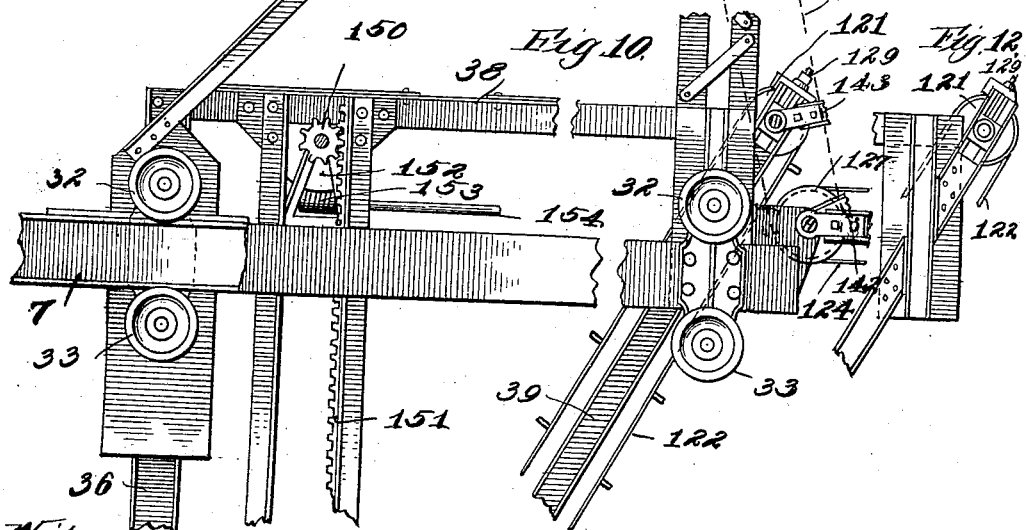
Witnesses:
G. A. Tauberschmidt
W. A. Adams
Inventor
Robert V. Sutherland
By Cyrus W. Rice
Atty

UNITED STATES PATENT OFFICE.

ROBERT V. SUTHERLAND, OF SWEA TOWNSHIP, KOSSUTH COUNTY, IOWA.

DITCHING-MACHINE.

No. 921,179.   Specification of Letters Patent.   Patented May 11, 1909.

Application filed September 16, 1908. Serial No. 453,370.

*To all whom it may concern:*

Be it known that I, ROBERT V. SUTHERLAND, a citizen of the United States, and resident of the township of Swea, in the county of Kossuth and State of Iowa, have invented a certain new and useful Ditching-Machine, of which the following is a specification.

My invention relates to ditching machines for excavating ditches for drain tile, etc., and its object is to provide such a machine which shall be simple and economical in construction and easy and effective of operation. This object is attained by, and my invention is embodied in, the hereinafter described mechanism, illustrated by the accompanying drawings, in which:—

Figure 1:
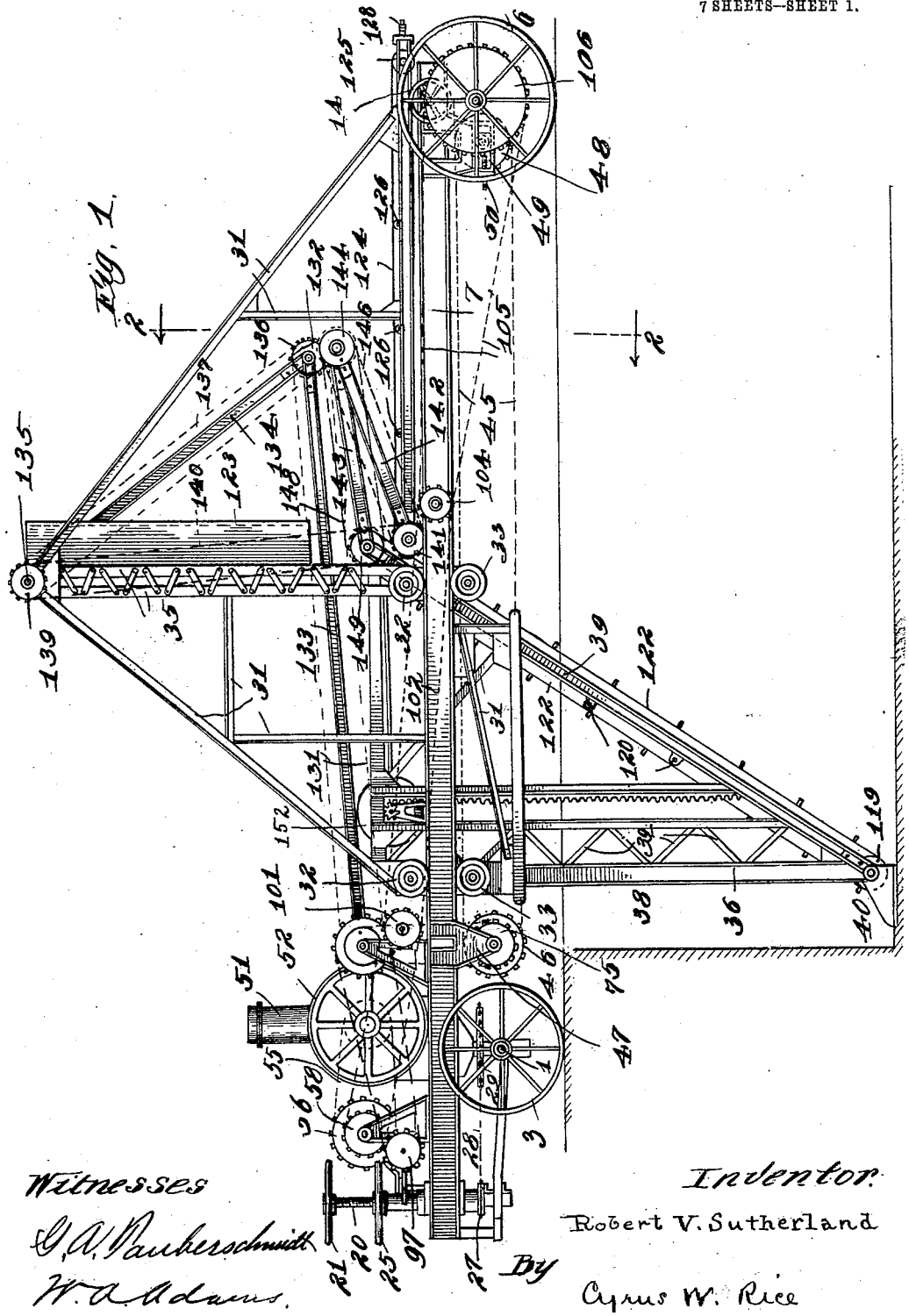
Figure 2:
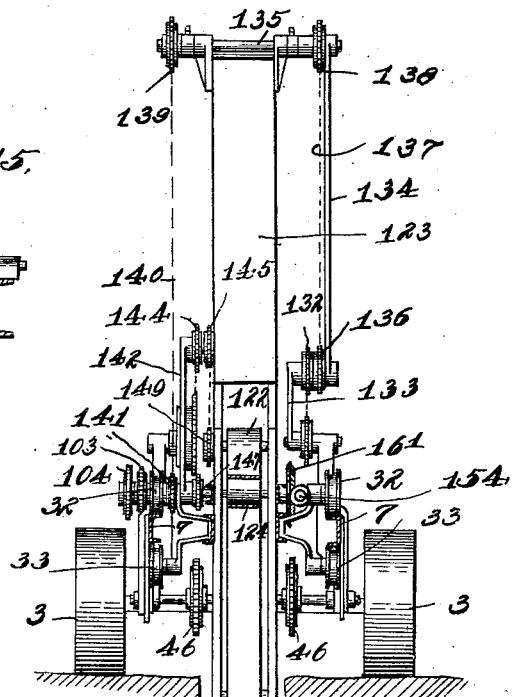
Figure 15:
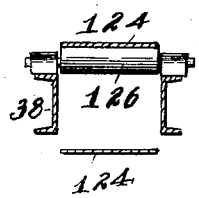
Figure 13:
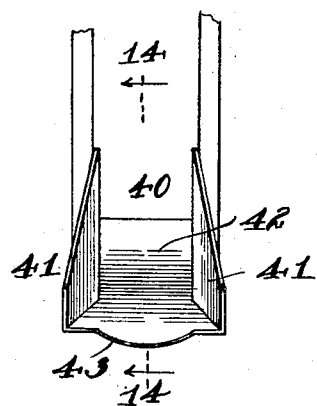
Figure 14:
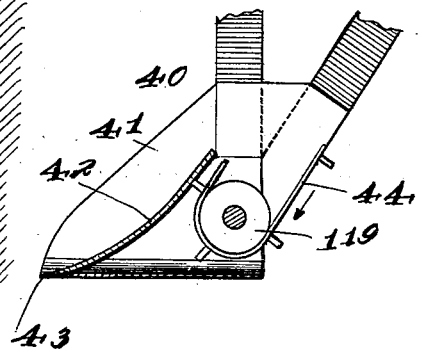

Figure 1 is a left side elevation of my ditching machine; Fig. 2 is a vertical cross section thereof on line 2—2 of Fig. 1; Fig. 3 is a plan view of the same; Fig. 4 is an enlarged rear view of the traction wheels' axle tree and adjacent parts; Fig. 5 is a vertical section of the same on line 5—5 of Fig. 4; Fig. 6 is an enlarged plan view of the forward portion of my ditching machine; Fig. 7 is a vertical cross section of the same on line 7—7 of Fig. 6; Fig. 8 is a vertical longitudinal section of the same on line 8—8 of Fig. 6; showing the mechanisms for guiding the machine and for leveling its frame; Fig. 9 is an enlarged plan view of the shovel carriage and forward portion of the traveler, etc.; Fig. 10 is an enlarged left side elevation of the forward portion of the traveler, the upper portion of the shovel carriage, etc.; Fig. 11 is a detail view showing in rear elevation the top portion of the traveler; Fig. 12 is a detail view of parts of the shovel carriage which bear the primary conveyer belt's driving roll; Fig. 13 is an enlarged detail view of the shovel in front elevation; Fig. 14 is a vertical section of the same on line 14—14 of Fig. 13; Fig. 15 is a vertical cross section of the secondary conveyer belt and the traveler on line 15—15 of Fig. 3; and Fig. 16 is a detail view of the forward axletree and its bolster in vertical section.

On the forward axletree 1 (having a bolster 2) on which axletree turn the vehicle wheels 3, and on the rear axletree 4 (having a bolster 5) on which axletree turn the traction wheels 6, is supported the frame 7 of the machine. Borne by the rear axle tree and its bolster and extending upward (as particularly shown in Figs. 4 and 5) are the parallel segmental plates 8 on whose flanged circumferences are supported correspondingly curved bearing members 9 whose flanged concave surfaces are adapted to slidably turn on the segmental plates 8. These curved bearing members are fastened to a cross beam 10 of the frame 7 and thus support it. A nut 11 between the segmental plates, pivoted thereto, and passing through a slot 12 in the cross beam 10, is moved by its screw 13 collared on the frame and having a handwheel 14 for turning: By rotating the handwheel and screw, the curved bearing members are turned by sliding on the segmental plates, in order to adjust the frame to a transversely level position.

The forward portion of the frame is supported (as particularly shown in Fig. 8) on a ball and socket joint, the ball 15 on and beneath the main frame 7 turning in its socket member 16 carried by a vertical screw 17 which turns in a nut 18 borne by the forward axletree 1 and its bolster 2. For lubricating the screw, its lower end descends into an oil cup 19.

A vertical guiding shaft 20 near the forward end of the frame, having a handwheel 21 for turning and threaded on its upper portion as shown, is provided with a gear 22 meshing with a segmental rack 23 carried by the forward bolster 2, and serves to guide the machine in traveling. A tubular shaft 24 surrounding the guiding shaft 20 and having a hand wheel 25 for turning, is provided with a nut 26, turning on the threaded portion of the guiding shaft, and with a sprocket wheel 27 by which it transmits rotary motion by the chain 28 (indicated by dotted lines, as are all the chains in the several views) to the sprocket wheel 29 carried by the screw 17, in order to adjust the frame to a longitudinally level position by raising or lowering its forward end by turning the handwheel 25, the pitch of the screw 17 and of the threaded portion of the guiding shaft 20 being such that the two sprocket wheels 27 and 29 are always maintained in the same plane.

The traveler 30, braced at 31, is reciprocated as hereinafter explained, on the frame in a horizontal and longitudinal direction, being carried by the double-flanged rolls 32 traveling on a track on top of the frame, and retaining rolls 33 below. In guides 34 and 35 on the traveler, the slides 36 and 37 of the shovel carriage 38, braced at 39, are moved vertically as hereinafter explained, to raise and lower the shovel 40 carried at the lower extremity of the shovel carriage. The shovel is provided with lateral wings 41 inclined outwardly and having cutting edges (as shown in Fig. 13) and with a share 42 (shown in vertical section in Fig. 14) which curves from its cutting edge 43 upward, to deliver the excavated earth to the primary conveyer belt 44.

The traveler is reciprocated forward and backward by the chain 45 attached thereto as shown, and carried on the driving sprocket wheels 46 turning in brackets 47 forward on the frame, and on the sprocket wheels 48 turning in brackets 49 rearward on the frame.

Suitable chain-tightening screws 50 are provided to maintain the proper tension of the chain.

The driving sprocket wheels 46 are rotated and the traveler reciprocated by suitable power, as by the engine (gasolene or other) indicated at 51 having suitable balance wheels 52. Special reference being now had to Figs. 6 and 7, a sprocket wheel 53 on the engine shaft 54 (which turns in the direction of clock hands when viewed from the engine) transmits power by the chain 55 to the sprocket wheel 56 on the shaft 57. By the sprocket wheel 58 and chain 59 the power to reciprocate the traveler forward (to make a cutting) is communicated to the sprocket wheel 60 on the shaft 61: By the sprocket wheel 62, on the same shaft 61, and the chain 63 (as shown in Fig. 7) the motion is transmitted to the idle sprocket wheel 64 having the clutch member 65 and turning on the shaft 66, to which are keyed the driving sprocket wheels 46 carrying the chains 45 attached to the traveler for reciprocating the same.

The traveler is reciprocated backward at the end of a cutting (and at a greater speed than forward to make a cutting) by the gear 67 on the shaft 57, meshing with the gear 68 on the shaft 69: A sprocket wheel 70 on the shaft 69 transmits power by the chain 71 to the sprocket wheel 72 turning idly on the shaft 61: This motion is transmitted by the sprocket wheel 73, on the same hub with the sprocket wheel 72 and turning with it, by the chain 74 (as shown in Fig. 7) to the idle sprocket wheel 75 having the clutch member 76 and turning on the shaft 66, to which are keyed the driving sprocket wheels 46 which carry the chains 45 attached to the traveler for reciprocating the same.

Clutch members 77 and 78 splined on the shaft 66 for reciprocating the traveler alternately forward and backward, are automatically operated by the following mechanism, illustrated in Figs. 7 and 3.

When permitted by the lever dogs 79 and 80, (provided to prevent the simultaneous engagement of both clutch members 77 and 78), etc., these clutch members 77 and 78 are thrown into their engagement, and so held, by the springs 81 pressing between a lug 82 on the frame, and the sliding collars 83 on the rod 84, which collars abut against the clutch levers 85 and 86: The lever dogs 79 and 80 pivoted on the frame, are provided with catches 87 adapted to engage the clutch levers to hold their respective clutch members out of engagement, and are so adjusted that both clutch members 77 and 78 may be simultaneously disengaged (when it is desired to stop the reciprocation of the traveler) and so that both cannot engage at the same time. The clutch lever whose clutch member is engaged is moved into the engagement of its lever dog, and thereupon the other clutch lever whose clutch member is disengaged is released from its engaging lever dog, by the movement of the rod 84 reciprocating in bearings 88 on the frame. Against screw-set collars 89 properly adjusted on the rod 84 the clutch levers are constantly pressed by the springs 81. When the rod 84 is reciprocated, the clutch lever whose clutch member is engaged is moved by its collar 89 against the pressure of its spring 81 until it is engaged by its lever dog to hold its clutch member out of engagement; then, the movement of the rod 84 continuing in the same direction, the other collar 89 strikes the under cam surface 90 of the other lever dog and thus raises it to release its clutch lever and allow its spring 81 to throw its clutch member into engagement. The movement of the rod 84 in the opposite direction first disengages the clutch member last mentioned and then engages that first mentioned in the same manner.

The rod 84 is reciprocated automatically to cause the traveler to move forward to make a cutting and backward into position for the next cutting, by a bell-crank lever 91 fulcrumed on the frame, one of whose arms engages in a slot 92 in the rod 84, and the other of whose arms is moved by a rod 93 pivoted thereto and extending rearward in slide bearings 94 on the frame, as shown in Fig. 3. On the traveler is fixed a suitable striker 95 adapted to strike adjustable screw-set collars or lugs 96 on the rod 93 to reciprocate it a short distance, in order to arrest the forward movement of the traveler when the cutting is finished and to stop its backward movement when it has reached its position for the next cutting.

The machine is moved from place to place on its vehicle wheels 3 and 6 by the same engine 51, which transmits power by the chain 55 to the sprocket wheel 56 as shown in Fig. 6: To move the machine forward, the gear 67 meshing with the gear 68 reverses the rotary motion and transmits it by the idle sprocket wheel 97, having the clutch member 98, by means of the chain 99 to the sprocket wheel 100 on the same shaft as the sprocket wheels 101, which transmit, by the chain 102, power to the idle sprocket wheels 103 (as shown in Fig. 3) on the same hubs respectively as the sprocket wheels 104 which in turn communicate motion by the chains 105 to the sprocket wheels 106 on the hubs of the rear vehicle traction wheels 6.

The machine is moved backward by the idle sprocket wheel 107 on the shaft 57 (as shown in Fig. 6), and having the clutch member 108, which wheel transmits power by the chain 109 to the sprocket wheel 110 on the same shaft with the sprocket wheels 101.

The splined clutch members 111 and 112 are moved into engagement with their respective clutch members 98 and 108 by suitable clutch levers 113 and 114 operated by hand lever 115, and connected by the link 116 adjusted so that both clutch members 111 and 112 may be simultaneously disengaged, but cannot both engage at the same time. A differential gear 117 of common form, on the shaft carrying the sprocket wheels 100, 101 and 110, and inclosed in the gear-box 118, serves to compensate for any different rate of rotation of the traction wheels 6 in traveling on a curved course.

Carried by the rolls 119 and 120 and the driving roll 121 (which is rotated as hereinafter explained) on the shovel carriage, travels the primary conveyer belt 122, inclined backward at its top as shown in Fig. 1. This primary conveyer receives the excavated earth from the shovel as hereinbefore explained, and carries it up and over the roll 121, whence it falls (through the vertical chute 123 on the traveler, when the machine is not cutting its greater depths) upon the secondary conveyer belt 124 carried by the rolls 125 and 126 and the driving roll 127 (which is rotated as hereinafter explained), on the traveler. This secondary conveyer carries the earth backward and over the roll 125 whence it falls into a previously excavated section of the ditch and is distributed, by the forward movement of the traveler, on drain tile which have been laid in the ditch during a preceding setting of the machine. In this manner, the tile are covered and the ditch filled over them. These conveyers are provided with belt-tightening screws 128 and 129, and are driven by the following mechanism. The sprocket wheel 130 (as particularly shown in Fig. 6) on the shaft 61 (rotated by the engine as hereinbefore explained) transmits power by the chain 131 to the idle sprocket wheel 132 concentric with the common pivot of the link bar 133 (whose other extremity is pivoted concentric with the sprocket wheel 130) and the swinging bar 134 (whose other extremity is pivoted on the shaft 135 on the upper end of the traveler), as shown; the sprocket wheel 136 on the same hub as the wheel 132 transmits motion by the chain 137 to the sprocket wheel 138 on the shaft 135; the sprocket wheel 139 on the other end of the shaft 135, transmits the motion by the chain 140 to the sprocket wheel 141 whose shaft on the traveler carries the driving roll 127 of the secondary conveyer belt and thus operates it.

The primary conveyer belt 122 is operated by the following additional mechanism: Link bars 142 and 143 pivoted together concentric with the sprocket wheels 144 and 145 which they carry, are pivoted at their other extremities, the one—link bar 142—on the traveler concentric with the sprocket wheel 141, and the other—link bar 143—on the upper end of the shovel carriage and concentric with the driving roll 121 of the primary belt conveyer 122. A chain 146 transmits motion from the sprocket wheel 147 on the same shaft with the sprocket wheel 141, to the sprocket wheel 144 which by the sprocket wheel 145 on the same hub, rotates by the chain 148 the sprocket wheel 149 on the shaft of the primary conveyer belt's driving roll 121, thus operating the primary belt conveyer.

The shovel carriage with its shovel is raised by the same power, the engine 51, and is lowered automatically for each successive cutting, by means of the following mechanism. The shovel carriage is reciprocated vertically on its slides 36 and 37 by gears 150 on the traveler, meshing with the racks 151 on the shovel carriage, and placed directly above the center of gravity of the shovel carriage. These gears 150 are rotated by the worm gear 152 on the same shaft, which is turned by the worm 153 whose shaft 154 carries the oppositely disposed idle bevel gears 155 and 156 (having clutch members 157 and 158) and the splined clutch members 159 and 160. When engaged by its clutch members, either of these bevel gears mesh with the bevel gear 161 on the same driving shaft (rotated as hereinbefore explained) with the secondary belt conveyer's driving roll 127 and sprocket wheel 141, the bevel gear 161 being thus rotated. When the traveler is reciprocated backward to nearly its rearmost position, the clutch lever 162 strikes a lug 163 (adapted to engage it going in that direction) on the frame, thus automatically engaging by the clutch members 158 and 160, the bevel gear 156 with the driving bevel gear 161; by this action the shovel and its carriage are lowered a short distance to a proper position for making a cutting: the clutch lever 162 being carried by the continued rearward movement of the traveler past its engagement with the lug 163, its clutch member 160 is released from its engagement by the spring 164, and the rotation of the bevel gear 161 ceases.

When the ditch has been excavated to the desired depth, the shovel is raised to above the surface of the ground by engaging the clutch members 157 and 159 by the hand operated clutch lever 165 which causes the bevel gear 161 to rotate the bevel gear 155, thus rotating the worm 153 in the opposite direction.

The operation of my ditching machine is manifest from the foregoing description of the character, location and action of its various parts. It will be seen that when a section of the ditch has been excavated to the desired depth by the repeated reciprocation of the traveler operating the shovel at successively greater depths, the machine may be moved forward a sufficient distance to excavate the next section; and that drain tile may be laid in the ditch behind the section being excavated and before the section being filled.

My present invention is an improved form, for some uses, of my broader and more generic invention described and claimed in my application Serial Number 391,566 filed September 6th, 1907.

It is evident that my invention may be embodied in other and varying mechanisms without departing from its scope and spirit: and therefore I do not propose to confine myself to the details of construction shown and described.

I claim:

1. In a machine of the character described, a frame, a traveler having a horizontal movement on the frame, and a shovel carriage having a vertical movement on the traveler.

2. In a machine of the character described, a frame, a traveler having a horizontal movement on the frame, a shovel carriage having a vertical movement on the traveler, means for moving the traveler, and means for moving the shovel carriage.

3. In a machine of the character described, a frame, a traveler having a horizontal movement on the frame, a shovel carriage having a vertical movement on the traveler, and an earth conveyer on the shovel carriage.

4. In a machine of the character described, a frame, a traveler having a horizontal movement on the frame, a shovel carriage having a vertical movement on the traveler, an earth conveyer on the traveler, and an earth conveyer on the shovel carriage adapted to deliver the excavated earth to the conveyer on the traveler.

5. In a machine of the character described, a frame, a traveler having a horizontal movement on the frame, a shovel carriage having a vertical movement on the traveler, an earth conveyer on the shovel carriage, means for moving the traveler, and means for moving the shovel carriage.

6. In a machine of the character described, a frame, a traveler having a horizontal movement on the frame, a shovel carriage having a vertical movement on the traveler, an earth conveyer on the traveler, an earth conveyer on the shovel carriage adapted to deliver the excavated earth to the conveyer on the traveler, means for moving the traveler, and means for moving the shovel carriage.

7. In a machine of the character described, the combination of a frame, a traveler having a horizontal movement on the frame, a shovel carriage having a vertical movement on the traveler, means for moving the traveler, and means for automatically initiating and arresting the movement of the traveler.

8. In a machine of the character described, the combination of a frame, a traveler having a horizontal movement on the frame, a shovel carriage having a vertical movement on the traveler, means for moving the traveler, means for automatically initiating and arresting the movement of the traveler, means for moving the shovel carriage, and means for automatically initiating and arresting the downward movement of the shovel carriage.

9. In a machine of the character described, the combination of a frame, a traveler having a horizontal movement on the frame, an earth conveyer on the traveler, a swinging link-bar pivoted on the traveler, a second link-bar pivoted on the swinging link-bar and on the frame, and means for transmitting power from the frame to the swinging link-bar and thence to the traveler to drive the conveyer.

10. In a machine of the character described, the combination of a frame, a traveler having a horizontal movement on the frame, a shovel carriage having a vertical movement on the traveler, an earth conveyer on the traveler, an earth conveyer on the shovel carriage adapted to deliver the excavated earth to the conveyer on the traveler, a swinging link-bar pivoted on the traveler, a second link-bar pivoted on the swinging link-bar and on the frame, a third link-bar pivoted on the traveler, a fourth link-bar pivoted on the third link-bar and on the shovel carriage, and means for transmitting motion from power on the frame to the swinging link-bar, thence to the third link-bar, and thence to the fourth link-bar and the shovel carriage to drive the conveyers.

In testimony whereof, I have signed my name to this specification in the presence of two subscribing witnesses.

ROBERT V. SUTHERLAND.

Witnesses:
EDWARD F. KNOWLES,
ROBERT GUEST.